(12) United States Patent
Dudar et al.

(10) Patent No.: US 9,970,393 B2
(45) Date of Patent: May 15, 2018

(54) METHOD AND SYSTEM FOR PURGE CONTROL

(71) Applicant: Ford Global Technologies, LLC, Dearborn, MI (US)

(72) Inventors: Aed M. Dudar, Canton, MI (US); Matthew Werner, Marysville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 14/676,607

(22) Filed: Apr. 1, 2015

(65) Prior Publication Data

US 2016/0290285 A1 Oct. 6, 2016

(51) Int. Cl.
*F02B 33/44* (2006.01)
*F02M 25/08* (2006.01)
*F02B 37/18* (2006.01)
*F01N 5/04* (2006.01)

(52) U.S. Cl.
CPC .............. *F02M 25/089* (2013.01); *F01N 5/04* (2013.01); *F02B 37/183* (2013.01); *F02M 2025/0881* (2013.01); *Y02T 10/144* (2013.01); *Y02T 10/16* (2013.01)

(58) Field of Classification Search
CPC ......... F02M 35/10163; F02M 35/1085; F02M 35/104; F02M 31/08; F02B 37/16
See application file for complete search history.

(56) References Cited

U.S. PATENT DOCUMENTS

| | | | |
|---|---|---|---|
| 5,146,902 A | 9/1992 | Cook et al. | |
| 5,273,020 A | 12/1993 | Hayami | |
| 5,297,529 A | 3/1994 | Cook et al. | |
| 6,138,644 A * | 10/2000 | Saruwatari | F02M 25/08 123/519 |
| 7,228,851 B2 | 6/2007 | Nakamura et al. | |
| 7,293,552 B2 | 11/2007 | Leone et al. | |
| 7,395,780 B2 | 7/2008 | Maiser, Jr. et al. | |
| 7,743,752 B2 | 6/2010 | Kerns et al. | |
| 7,877,189 B2 | 1/2011 | Leone | |
| 7,918,214 B2 | 4/2011 | Kerns et al. | |
| 8,109,259 B2 | 2/2012 | Ulrey et al. | |
| 8,312,765 B2 | 11/2012 | Pursifull et al. | |
| 8,590,514 B2 | 11/2013 | Pursifull | |
| 2004/0237946 A1 * | 12/2004 | Murakami | F02M 25/08 123/520 |
| 2014/0257672 A1 * | 9/2014 | Surnilla | F02M 25/089 701/103 |
| 2015/0083087 A1 | 3/2015 | Pearce et al. | |

\* cited by examiner

*Primary Examiner* — Ngoc T Nguyen
(74) *Attorney, Agent, or Firm* — Julia Voutyras; McCoy Russell LLP

(57) ABSTRACT

Methods and systems are provided for purging a fuel vapor canister during conditions when purge vacuum is limited, such as during boosted conditions. An exhaust-driven purge pump is used to flow positive pressure air through a canister, and purge the canister to a compressor inlet. The air is heated during the pressurization, improving hydrocarbon desorption from the canister.

15 Claims, 4 Drawing Sheets

METHOD AND SYSTEM FOR PURGE CONTROL

FIELD

The present description relates generally to methods and systems for controlling purging of a fuel system canister.

BACKGROUND/SUMMARY

Vehicles may be fitted with evaporative emission control systems such as on-board refueling vapor recovery (ORVR) systems. Such systems capture and reduce release of vaporized hydrocarbons to the atmosphere, for example fuel vapors released from a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel.

As such, for emissions test compliance, a boosted engine must be able to purge under boosted and naturally-aspirated conditions. Typically, engine intake manifold vacuum is used to purge the canister during non-boosted conditions. Therein, a purge valve coupled between the canister and the engine is opened so that fresh air can enter the canister, dislodge the trapped vapors, and direct the vapors to the intake manifold for combustion in the cylinders. An alternate purge path is used during boosted conditions. For example, as shown by Pursifull et al. in U.S. Pat. No. 8,312,765, a portion of boosted airflow is directed through an ejector (or venturi) and vacuum generated at the ejector is used to purge fuel vapors from the canister into the compressor, and from the compressor onwards to the boosted engine.

However, the inventors herein have recognized potential issues with such systems. As one example, the ejector may be limited by the amount of vacuum it can generate. During naturally-aspirated conditions, the amount of vacuum available may be significantly higher, allowing for larger purge rates. However, during boosted conditions, ejector choke may restrict the amount of vacuum that the ejector can produce. If the engine spends a large portion of the drive cycle under boost, the canister may not be sufficiently purged. To overcome the ejector and enable a higher purge rate, a substantially larger ejector may be required. However, this may add to component costs and packaging constraints. As another example, there may be conditions where the engine operates between boost and natural aspiration (herein also referred to as "no man's land"). During such conditions, there may neither be sufficient boost nor sufficient intake manifold vacuum for effectively purging the canister. Further still, the purge path under boosted conditions may be lengthy, affecting the purge rate. As such, if the canister is not sufficiently purged, engine emissions may be degraded.

In one example, the issues described above may be addressed by a method for an engine comprising: during boosted engine operation, purging a fuel vapor canister to a compressor inlet with positive pressure drawn from an exhaust-driven pump. In this way, a more thorough purging of a fuel system canister can be achieved during boosted engine operation without the need for additional ejector hardware. In addition, the purge pump may be used to enhance canister purging during selected naturally-aspirated conditions.

As one example, during boosted engine operation, engine exhaust gas may be used to drive a purge pump. Specifically, the discharged exhaust may be used to spin the pump, which then draws in fresh air and delivers it, at positive pressure, into the canister. Due to the pressurization, the air pumped into the canister may at a higher temperature than ambient air. An output of the pump may be controlled via adjustments to a wastegate coupled to the pump. The pumped fresh air dislodges fuel vapors trapped in the canister, and delivers them, via a dedicated purge path, to a compressor inlet. The purged vapors are then combusted in the engine. During un-boosted conditions, intake manifold vacuum may be applied on the canister and fuel vapors purged using ambient air may be delivered to the engine intake, downstream of an intake throttle, via an alternate purge path (distinct from the one used during boosted purge). However, during selected un-boosted conditions, where there is insufficient manifold vacuum available for purging the canister (such as during wide open throttle conditions), exhaust pressure from the un-boosted engine operation can also be advantageously used to drive the purge pump and clean the canister.

In this way, an exhaust-driven purge pump may be used to more completely purge a fuel vapor canister during boosted engine operation. Further, the exhaust-driven purge pump may be used to more completely purge a fuel vapor canister during un-boosted engine operation where there is insufficient manifold vacuum available for purging. The technical effect of using the purge pump to deliver pressurized ambient air into the canister is that the air entering the canister may be heated, serendipitously improving desorption of hydrocarbons from the canister. As such, this results in a cleaner canister. Further, by improving the purging capacity during boosted conditions, the need for relying on larger ejectors for effective boosted purging is reduced. Since operation of the purge pump does not rely on either the flow of boosted air from the compressor or intake manifold vacuum, boosted purging may not be affected by changes in boost pressure or engine intake vacuum. Instead, the purge pump may be advantageously used to allow canister purging to continue even as boost pressure or engine intake vacuum changes. By enabling the canister to be sufficiently purged, exhaust emissions compliance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
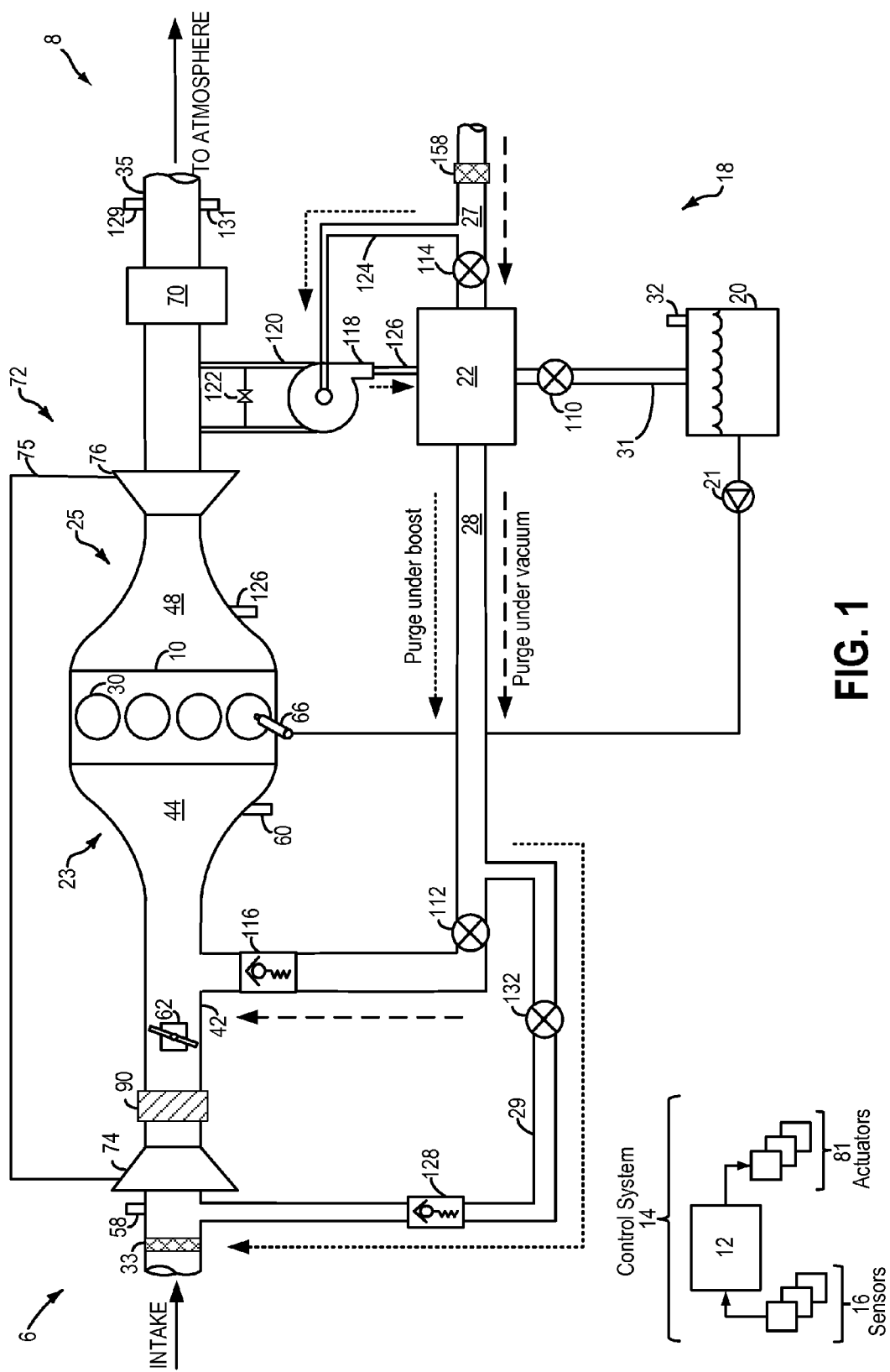
FIG. 1 shows a schematic depiction of an example fuel system coupled to an internal combustion engine.

The following description relates to systems and methods for an engine system, such as the engine system of FIG. 1, wherein purging of a fuel system canister during boosted engine operating conditions is enabled using an exhaust-driven purge pump. A controller may be configured to perform a control routine, such as the example routine of FIG. 2, to purge a fuel system canister to the engine intake using intake manifold vacuum during naturally-aspirated engine operating conditions when there is sufficient manifold vacuum available, and purge the canister to a compressor inlet using positive pressure from the purge pump during boosted engine operating conditions. The purge pump is also used to purge the canister during naturally-aspirated engine operating conditions when there is insufficient manifold vacuum available. Example purging operations are shown with reference to FIGS. 3-4. In this way, a more thorough cleaning of the canister can be enabled over a wider range of engine operating conditions.

FIG. 1 shows a schematic depiction of an engine system 8. Engine system 8 may be coupled in a propulsion system 6. In one example, propulsion system 6 may be hybrid vehicle system 6 that can derive propulsion power from engine system 8 and/or an on-board energy storage device (not shown). Alternatively, propulsion system 6 may only derive propulsion power from engine system 8.

Engine system 8 may include an engine 10 having a plurality of cylinders 30. In the present example, engine 10 is a spark-ignition engine of a vehicle. Combustion events in each cylinder drive a piston which in turn rotates a crankshaft, as is well known to those of skill in the art. Further, engine 10 may include a plurality of engine valves for controlling the intake and exhaust of gases in the plurality of cylinders.

Engine 10 includes an engine intake 23 and an engine exhaust 25. Engine intake 23 includes a main air intake throttle 62 fluidly coupled to the engine intake manifold 44 via an intake passage 42. Air may enter intake passage 42 from an air intake system including an air filter 33 in communication with the vehicle's environment. A position of main throttle 22 may be varied by controller 12 via a signal provided to an electric motor or actuator included with the main throttle 62, a configuration that is commonly referred to as electronic throttle control. In this manner, throttle 62 may be operated to vary the intake air provided to the intake manifold.

In the example embodiment shown in FIG. 1, mass air flow (MAF) sensor 58 is coupled in intake passage 42 for providing signals regarding mass air flow in the intake passage to controller 12. In the depicted example, MAF sensor 58 provides a signal regarding mass air flow at the inlet of intake passage 42, upstream of air filter 33. However, it will be appreciated that the MAF sensors may be coupled elsewhere in the intake system or engine system, and further, there may be a plurality of MAF sensors arranged in the intake system or engine system.

A sensor 60 may be coupled to intake manifold 44 for providing a signal regarding manifold air pressure (MAP) and/or manifold vacuum (MANVAC) to controller 12. For example, sensor 60 may be a pressure sensor or a gauge sensor reading vacuum, and may transmit data as negative vacuum (e.g., pressure) to controller 12. In some examples, additional pressure/vacuum sensors may be coupled elsewhere in the engine system to provide signals regarding pressure/vacuum in other areas of the engine system to controller 12. These may include, for example, a sensor coupled to intake passage 42 upstream of the compressor, for providing a signal regarding barometric pressure (BP), a compressor inlet pressure (CIP) sensor arranged upstream of the compressor, etc.

As shown, engine system 8 is a boosted engine system including a boosting device, herein in the form of a compressor 74. In the depicted example, compressor 74 is the compressor of turbocharger 72, wherein compressor 74 is coupled to and driven by an exhaust turbine 76 via a shaft 75. Further, compressor 74 may be, at least in part, driven by an electric motor or the engine crankshaft. In alternate embodiments, the boosting device may be a compressor of a supercharger wherein the compressor is driven only by the electric motor.

Compressor 74 is configured to boost an intake air charge received along intake passage 42. Specifically, compressor 74 draws in intake air at atmospheric air pressure and boosts it to a higher pressure. Using the boosted intake air, a boosted engine operation may be performed. In embodiments where the boosting device is a compressor of a turbocharger, the boosted air is introduced pre-throttle. In alternate embodiments, where compressor 74 is a compressor of a supercharger, the throttle is positioned before the boosting device. A charge air cooler (or intercooler) 90 is coupled downstream of compressor 74 for cooling the boosted air charge before delivery to the intake manifold.

Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, particulate filter, oxidation catalyst, etc.

Engine system 8 may be coupled to a fuel system 18. Fuel system 18 may include a fuel tank 20 coupled to a fuel pump system 21 and one or more (one depicted in the present example) fuel vapor canisters 22. Fuel tank 20 may hold a plurality of fuel blends, including fuel with a range of alcohol concentrations, such as various gasoline-ethanol blends, including E10, E85, gasoline, etc., and combinations thereof. Fuel pump system 21 may include one or more pumps for pressurizing fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, described further below, via conduit 31, before being purged to the engine at a post-throttle location, or a pre-compressor location, as discussed below.

A fuel tank pressure sensor 32 may be coupled to the fuel tank for estimating a fuel tank pressure, or fuel tank vacuum level. While the pressure sensor is shown mounted to the fuel tank, it will be appreciated that in alternate examples, the pressure sensor may be coupled in conduit 31, upstream or downstream of isolation valve 110.

Fuel vapor canisters 22 may be filled with an appropriate adsorbent, for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor recovery system 22 may be purged to engine intake 23 via purge line 28 during un-boosted engine operating conditions, or purged to the compressor inlet via purge line 29 during boosted engine operating conditions. Distinct canister purge valves (CPVs) may be coupled to the distinct purge lines. Specifically, a first canister purge valve 112 may be coupled in (first or primary) purge line 28 while a second, different canister purge valve 132 (CPV2) may be coupled in (second or secondary) purge line 29. Purge line 28 couples canister 22 to the engine intake at a location downstream of intake throttle 62. Purge line 29 branches off from purge line 28 at a location upstream of canister purge valve 112, and couples canister 22 to an inlet of compressor 74.

Canister 22 may be further coupled to a vent 27 which may route gases out of the canister 22 to the atmosphere when storing, or trapping, fuel vapors from fuel tank 20. Vent 27 includes a canister vent valve 114 that allows fresh air to be drawn into canister 22 when purging stored fuel vapors to engine intake 23 under vacuum. In addition, vent 27 includes a dust box 158, for filtering the air drawn into canister 22. While this example shows vent 27 communicating with fresh, unheated air, various modifications may also be used.

One or more oxygen sensors may be coupled to the canister (e.g., downstream of the canister), or positioned in the engine intake and/or engine exhaust (e.g., sensor 126 coupled to exhaust manifold 48) to provide an estimate of a canister load (that is, an amount of fuel vapors stored in the canister). Based on the canister load, and further based on engine operating conditions, such as engine speed-load conditions, purging conditions may be confirmed and a purge flow rate may be determined.

Canister 22 may be further coupled to a positive pressure purge pump 118. As elaborated below, during boosted engine operation, purge pump 118 may be used to generate and apply positive pressure on canister 22, and purge the canister to a compressor inlet location. Purge pump 118 may be an exhaust-driven purge pump, that is, the pump may be spun via power from engine exhaust. Exhaust received from downstream of turbine 76 may be flowed through conduit 120, thereby driving pump 118. In some examples, a bypass valve may be coupled at the junction of exhaust passage 35 and conduit 120 allowing exhaust to be redirected through conduit 120 during purging conditions, and disabling exhaust flow through conduit 120 when purging conditions are not met. The exhaust, after driving the pump, may be returned to exhaust passage 35, at a location upstream of emission control device 70.

A wastegate 122 coupled across purge pump 118 may be configured to adjust the flow of exhaust through conduit 120, thereby controlling the output of purge pump 118. For example, an opening of wastegate 122 may be increased to reduce an output of purge pump 118, while an opening of wastegate 122 may be decreased to increase an output of purge pump 118. Further, the wastegate opening may be adjusted responsive to changes in fuel tank pressure and/or boost pressure during canister purging under boost. As such, changes in engine exhaust pressure may influence purge pump operation. Since exhaust pressure is affected by boost pressure, changes in boost pressure may also affect purge pump operation. In one example, wastegate opening may be increased to reduce the purge pump output responsive to an increase in fuel tank pressure during the purging. In another example, wastegate opening may be increased to reduce the purge pump output responsive to an increase in boost pressure during the purging.

As such, canister 22 may be purged during boosted conditions as well as naturally-aspirated conditions (herein also referred to as un-boosted conditions). As such, distinct purge paths are used to purge the canister under vacuum versus under boost. The inability to purge under boost can cause a boosted engine to fail emissions tests. This may be especially true in smaller engines that operate under boost during much of the drive cycle.

During un-boosted conditions, the canister is purged under vacuum by applying negative pressure from the engine intake manifold on the canister to draw fuel vapors from the canister to the engine intake. Specifically, during un-boosted engine operation, while there is sufficient manifold vacuum available, in response to purging conditions being met (such as when the canister load is higher than a threshold load), canister vent valve 114 and a first canister purge valve 112 may be opened. At the same time, second canister purge valve 132 may be closed. Engine intake vacuum may then be applied on canister 22 causing fresh air (at ambient temperature) to be drawn into canister 22 via vent 27. The fresh air may dislodge fuel vapors from the canister, which are then flowed along purge line 28 to the engine intake, at a location downstream of intake throttle 62 (see long dashed arrows representing purge under vacuum). In some examples, as depicted, a canister check valve 116 may be included in purge line 28 to prevent flow in the reverse direction into purge line 28.

In comparison, during boosted conditions, the canister is purged under boost by applying positive pressure from purge pump 118 on the canister to flow fuel vapors from the canister to the inlet of compressor 74. Specifically, during boosted engine operation, in response to purging conditions being met (such as when the canister load is higher than a threshold load), canister vent valve 114 and first canister purge valve 112 may be closed. At the same time, second canister purge valve 132 may be opened. In addition, exhaust flow may be diverted through conduit 120, an amount of exhaust flow directed through conduit 120 and purge pump 118 adjusted by controlling the opening of wastegate 122. Exhaust flow through conduit 120 is used to spin-up purge pump 118 which then draws fresh air through vent 27 and pump intake conduit 124. The drawn fresh air is then pressurized upon passage through purge pump 118 and delivered to canister 22 via pump exhaust conduit 126.

As such, due to the pressurization via purge pump 118, a temperature of air delivered to canister 22 may be higher. In other words, the air received in canister 22 from purge pump 118 is hotter than the air received in purge pump 118 from vent 27. Further, the air received in canister 22 from purge pump 118 during purging under boost is hotter than the air received in canister 22 from vent 27 during purging under vacuum. The hotter air used for purging under boost provides various advantages. For example, the heated air enhances desorption of hydrocarbons from the canister. In addition, the heated air improves hydrocarbon migration. The combination of effects allows for faster cleaning of the canister under boosted conditions than would have otherwise been possible (such as if the canister were purged under boost using fresh air drawn into the canister via an ejector, the ejector driven using boosted airflow).

Heated positive pressure air from the purge pump is then applied on canister 22, dislodging fuel vapors from the canister. The released fuel vapors are then flowed initially along purge line 28, and then along purge line 29 to the inlet of compressor 74. From there, the fuel vapors are ingested in the engine intake, upon passage through compressor 74 and charge air cooler 90 (see short dashed arrows representing purge under boost). In some examples, as depicted, a check valve 128 may be included in purge line 29 to prevent boost pressure from causing the reverse flow of fuel vapors towards canister 22 in purge line 29.

In embodiments where engine system 8 is coupled in a hybrid vehicle, the vehicle may have reduced engine operation times due to the vehicle being powered by engine system 8 during some conditions, and by an on-board energy storage device or electric motor under other conditions. While the reduced engine operation times reduce overall carbon emissions from the vehicle, they may also lead to insufficient purging of fuel vapors from the vehicle's emission control system. To address this, fuel tank 20 may be designed to withstand high fuel tank pressures. For example, fuel tank 20 may be constructed of material that is able to structurally withstand high fuel tank pressures (such as fuel tank pressures that are higher than a threshold and below atmospheric pressure). Additionally, a fuel tank isolation valve (FTIV) 110 may be included in conduit 31 such that fuel tank 20 is coupled to the canister of fuel vapor recovery system 22 via the valve. Isolation valve 110 may be a solenoid valve wherein operation of the valve may be regulated by adjusting a driving signal to (or pulse width of) the dedicated solenoid (not shown). Isolation valve 110 may normally be kept closed to limit the amount of fuel vapors absorbed in the canister from the fuel tank. The normally closed isolation valve thereby separates storage of refueling vapors from the storage of diurnal vapors. The isolation valve is selectively opened during refueling to allow refueling vapors to be directed to the canister. As another example, the normally closed isolation valve may be opened during selected purging conditions, such as when the fuel tank pressure is higher than a threshold (e.g., a mechanical pressure limit of the fuel tank above which the fuel tank and other fuel system components may incur mechanical damage), to release fuel vapors into the canister and maintain the fuel tank pressure below pressure limits. The isolation valve 110 may also be closed during leak detection routines to isolate the fuel tank from the engine intake. Further, when included, FTIV 110 may be held closed during purging conditions, including during purge under boost as well as purge under vacuum.

The exhaust-driven purge pump may also be operated during selected un-boosted conditions when there is insufficient manifold vacuum available. This may include, for example, during engine operation at wide-open throttle (WOT). During such un-boosted conditions, the first canister purge valve and the vent valve may be held closed while the second canister purge valve is opened and the canister is purged to the compressor inlet. The exhaust-driven purge pump may also be operated during purging conditions when the engine is operating in a "no man's land" between natural aspiration and boost. During such conditions, there may neither be sufficient manifold vacuum nor sufficient boost pressure to effectively purge the canister. During such conditions, the available exhaust pressure and concurrent wastegate adjustments may be used to drive the purge pump and use positive pressure to purge the canister to the compressor inlet.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, exhaust temperature sensor 128, exhaust pressure sensor 129, fuel tank pressure sensor 32, MAP sensor 60, and MAF sensor 58. Other sensors such as additional pressure, temperature, air/fuel ratio, and composition sensors may be coupled to various locations in the vehicle system 6. As another example, the actuators may include fuel injector 66, isolation valve 110, purge valves 112 and 132, vent valve 114, throttle 62, wastegate 122, and purge pump 118. The control system 14 may include a controller 12. The controller may receive input data from the various sensors, process the input data, and trigger the actuators in response to the processed input data based on instruction or code programmed therein corresponding to one or more routines. The controller 12 receives signals from the various sensors of FIG. 1 and employs the various actuators of FIG. 1 to adjust engine operation based on the received signals and instructions stored on a memory of the controller. It will be appreciated that engine operation may be adjusted by the controller based on action performed by the controller and/or in combination with actions performed by various engine actuators acting in concert with the controller. An example control routine is described herein with regard to FIG. 2.

It will be appreciated that FIG. 1 shows an example configuration of an engine fuel system with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 2:
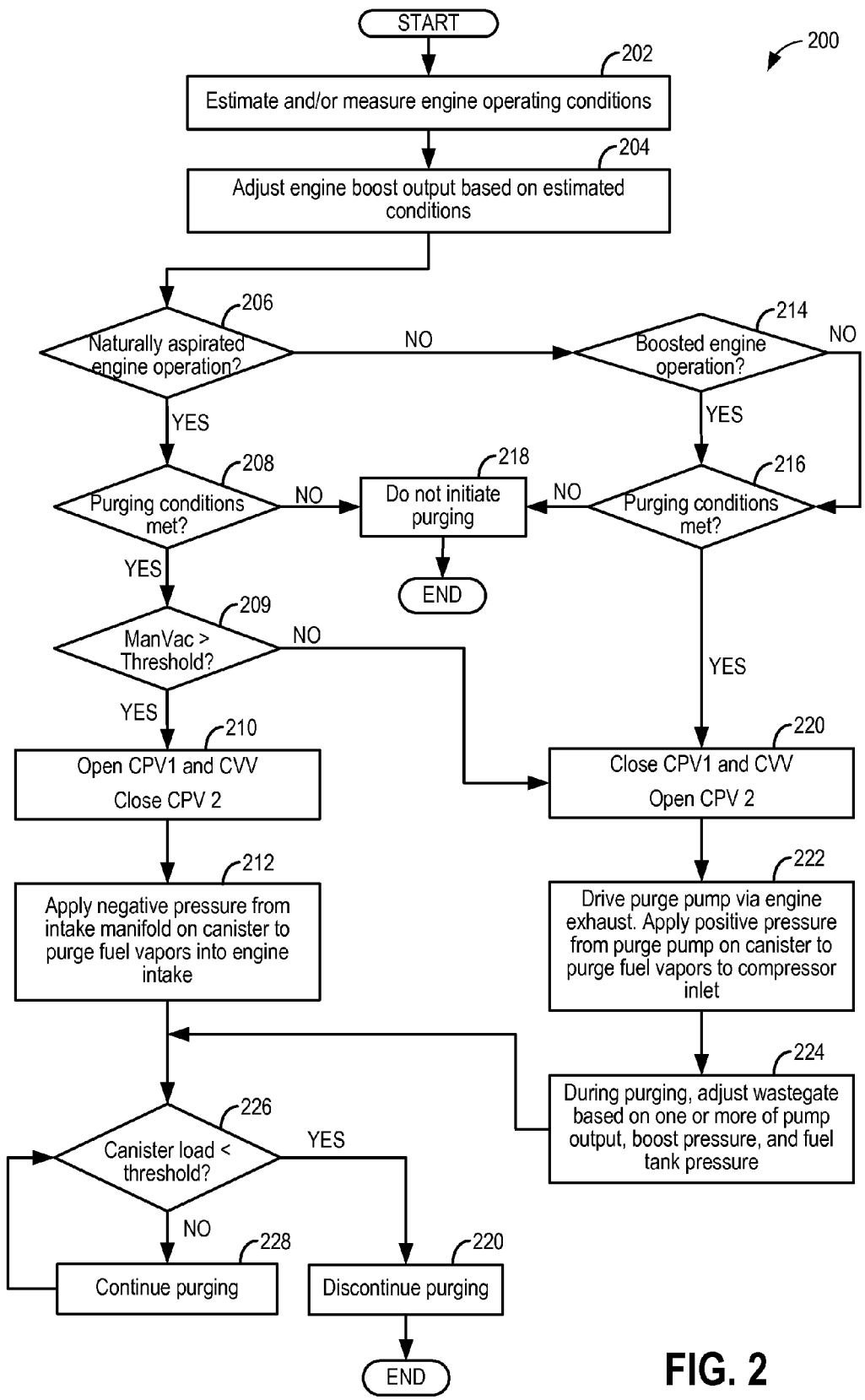
FIG. 2 shows a high level flowchart for selectively operating an exhaust-driven purge pump for purging a fuel system canister during boosted engine operation, and selected naturally aspirated engine operating conditions, according to the present disclosure.

Turning now to FIG. 2, an example routine 200 is shown for purging a fuel system canister under vacuum to an engine intake and purging the fuel system canister under boost to a compressor inlet. The method uses an exhaust-driven purge pump for purging the canister under boosted operating conditions, and selected un-boosted operating conditions, thereby improving boosted and un-boosted purge efficiency.

At 202, the routine includes estimating and/or measuring engine operating conditions. These may include, for example, engine speed, operator torque demand, ambient conditions (such as ambient temperature, pressure, and humidity), engine temperature, operator pedal position, canister load, etc. At 204, based on the estimated conditions, an engine boost output may be adjusted. For example, when engine speed-load is above a threshold range, the engine may be operated with boost, the boost pressure adjusted based on the torque demand. Operating the engine with boost includes spinning an intake compressor (such as compressor 74 of FIG. 1), via an exhaust turbine (such as turbine 76 of FIG. 1) at a speed that provides a desired boost pressure. The target boost pressure may be increased as the engine speed-load increases, or as the operator torque demand increases. As another example, when the engine speed-load is below the threshold range, or when the engine is idling, the engine may be operated without boost. Operating the engine without boost includes disabling the intake compressor and operating the engine with natural aspiration.

At 206, the method includes confirming if the engine is operating with natural aspiration. If yes, then at 208, the method includes determining if canister purging conditions have been met. In one example, canister purging conditions may be considered met if a hydrocarbon load of the canister (herein also referred to as the canister load) is higher than a threshold (e.g., an upper threshold). In another example, canister purging conditions may be considered met if more than a threshold duration (or distance) has elapsed since a last purging of the canister. If purging conditions are not met, then at 218, the method includes not initiating canister purging. Nominal un-boosted engine operation may be maintained and the routine may exit.

If purging conditions are met while the engine is operating with natural aspiration, then at 209, it may be determined if there is sufficient manifold vacuum (ManVac) available for purging the canister. For example, it may be determined if the manifold vacuum level is higher than a threshold vacuum level. If yes, canister purging under vacuum may be initiated. Specifically, at 210, the method includes opening each of a first canister purge valve (CPV1) coupled between the canister and the engine intake in a first purge line, and a vent valve (CVV) coupled in a vent line of the canister. At the same time, a second canister purge valve (CPV2) coupled between the canister and a compressor inlet in a second purge line is closed. In embodiments where the engine further includes a fuel tank isolation valve (also referred to as a vapor blocking valve) between the fuel tank and the canister, the isolation valve may also be closed. An opening of the canister purge valve may be adjusted to provide a target canister purge rate. The target canister purge rate may be based on engine operating conditions such as a combustion air-fuel ratio, engine speed-load, a canister load at a time of purging conditions being met, etc. For example, as the canister load at the time of purging increases, a higher purge rate (or higher purge flow) may be applied by opening the first canister purge valve to a higher degree. In some examples, the purge valve may be fully opened. At 212, the method includes applying negative pressure from the engine intake manifold on the canister to purge fuel vapors to the engine intake at the target purge rate. In this way, during non-boosted engine operation, the fuel vapor canister is purged to the engine intake, downstream of an intake throttle, with negative pressure drawn from the engine intake.

At 226, the method includes determining if the canister load is lower than a threshold (e.g., a lower threshold). As such, the canister load may drop as purging continues. If the canister has not been sufficiently purged, then at 228, the routine includes continuing to purge the canister under vacuum. That is, the first canister purge valve and the vent valve may be maintained open. Else, when the canister is sufficiently purged, purging under vacuum may be discontinued at 230. This includes closing the first canister purge valve while maintaining the canister vent valve open. In addition, a fuel tank isolation valve, if included, may also be maintained closed. Further, a purge history of the canister may be updated in the controller's memory. It will be appreciated that throughout the purge under vacuum, the second canister purge valve is held closed and the purge pump is not operated.

If sufficient manifold vacuum is not available at 209, such as when the engine is operating at wide open throttle (WOT; for example, due to the vehicle operator fully applying the accelerator pedal) or when manifold vacuum is lower than the threshold vacuum level, or when the engine is operating in a vacuum-less mode, the method moves to 220 wherein the exhaust-driven purge pump is used to purge the canister. Specifically, the method includes opening the second canister purge valve while closing each of the first canister purge valve and the vent valve. In embodiments where the engine further includes a fuel tank isolation valve (also referred to as a vapor blocking valve) between the fuel tank and the canister, the isolation valve may also be closed. An opening of the second canister valve may be adjusted to provide the target canister purge rate, as determined based on engine operating conditions such as combustion air-fuel ratio, engine speed-load, and canister load at a time of purging conditions being met. At 222, the method includes driving the exhaust-driven purge pump using engine exhaust. The exhaust spins the purge pump which draws in ambient air from the canister vent and into a pump intake conduit. The fresh air is the pressurized by the purge pump and directed into the canister. Consequently, positive pressure from the exhaust-driven purge pump is applied on the canister during un-boosted operating conditions to purge fuel vapors to a compressor inlet. As such, due to the pressurization of the air by the purge pump, the ambient air directed into the canister by the purge pump is at a higher temperature than the ambient air drawn into the canister during purging under vacuum. The use of heated air allows for a higher rate of desorption, and therefore a more thorough cleaning of the canister during the purge operation.

At 224, while operating the purge pump, an output of the exhaust-driven pump may be adjusted via a wastegate coupled across the pump. For example, the output of the purge pump may be adjusted responsive to changes in exhaust pressure and/or manifold vacuum during the purging. In one example, responsive to a sudden increase in manifold vacuum level (such as due to the vehicle operator releasing the accelerator pedal), the wastegate may be fully opened to decrease the output of the purge pump and discontinue purging the canister to the compressor inlet. Instead, canister purging with intake manifold vacuum may be resumed (as discussed earlier at 210-212). As another example, responsive to a sudden decrease in exhaust pressure, the wastegate opening may be decreased to increase the output of the purge pump and maintain purging of the canister to the compressor inlet at the target canister purge rate. From 224, the method moves to 226 wherein based on the canister load, it is determined whether to continue or discontinue the purging, as discussed earlier.

Returning to 206, if the engine is not operating with natural aspiration, then at 208, the method includes confirming that the engine is operating with boost. If yes, then at 216, the method includes determining if canister purging conditions have been met. If the engine is neither operating with natural aspiration, nor with boost, such as when the engine is operating in a "no man's land", the method proceeds to 216 to determine if canister purging conditions have been met. As such, in the no man's land, there may be neither be sufficient manifold vacuum for purging a canister (e.g., due to the manifold vacuum level being lower than a threshold vacuum level or due to the engine operating in a vacuum-less mode), nor sufficient boost pressure for purging the canister (e.g., due to the boost level or boost pressure being lower than a threshold boost level). During such conditions, if canister purging is required, the exhaust-driven purge pump may be advantageously used to clean the canister without relying on either engine intake vacuum or engine boost.

In one example, canister purging conditions may be considered met at 216 if a hydrocarbon load of the canister (herein also referred to as the canister load) is higher than a threshold (e.g., an upper threshold). In another example, canister purging conditions may be considered met if more than a threshold duration (or distance) has elapsed since a last purging of the canister. If purging conditions are not met, then at 218, the method includes not initiating canister purging. Nominal boosted engine operation (or operation in the no man's land) may be maintained and the routine may exit.

If purging conditions are met while the engine is operating with boost (or while the engine is operating in the no man's land), then canister purging under boost may be initiated.

Specifically, at 220, the method includes opening the second canister purge valve while closing each of the first canister purge valve and the vent valve. In embodiments where the engine further includes a fuel tank isolation valve (also referred to as a vapor blocking valve) between the fuel tank and the canister, the isolation valve may also be closed. An opening of the second canister valve may be adjusted to provide a target canister purge rate. During the purging under boost, a target canister purge rate may be determined based on engine operating conditions including a combustion air-fuel ratio, engine speed-load, a canister load at a time of purging conditions being met, a boost pressure, etc. At 222, the method includes driving an exhaust-driven purge pump using engine exhaust. The exhaust spins the purge pump which draws in ambient air from the canister vent and into a pump intake conduit. The fresh air is the pressurized by the purge pump and directed into the canister. Thus, at 222, the method further includes applying positive pressure from the exhaust-driven purge pump on the canister to purge fuel vapors to a compressor inlet. In this way, during boosted engine operation, the fuel vapor canister is purged to a compressor inlet with positive pressure drawn from an exhaust-driven pump.

As such, due to the pressurization of the air by the purge pump, the ambient air directed into the canister by the purge pump is at a higher temperature than the ambient air drawn into the canister during purging under vacuum. The use of heated air allows for a higher rate of desorption, and therefore a more thorough cleaning of the canister during the boosted purge operation.

At 224, the method further includes, while operating the purge pump and purging the canister under boost, adjusting an output of the exhaust-driven pump via a wastegate coupled across the pump. Herein, the wastegate can be used to limit the amount of pressure the purge pump can generate. In one example, the default position of the wastegate during the purging under boost may be a closed (or partially open) position. The wastegate opening is then adjusted from the default position to vary the pump output, and thereby the canister purge rate. For example, as the canister load at the time of purging increases, a higher target purge rate (or higher purge flow) may be applied. As another example, as the boost pressure (or exhaust pressure) at the time of purging increases, a higher target purge rate (or higher purge flow) may be applied. As such, the exhaust pressure affects the pump output, and since the exhaust pressure is influenced by the boost pressure, the boost pressure affects the pump output. The adjusting of the wastegate may include decreasing an opening of the wastegate to increase an output of the exhaust-driven pump, for example, responsive to an actual canister purge rate being lower than a desired purge rate (at a given boost or exhaust pressure). As another example, the adjusting may include increasing an opening of the wastegate to decrease an output of the exhaust-driven pump, for example, responsive to an actual canister purge rate being higher than a desired purge rate (at a given boost or exhaust pressure).

The opening of the wastegate may be further adjusted based on a fuel tank pressure. For example, in vehicles that do not include a fuel tank isolation valve between the fuel tank and the canister (e.g., in non-hybrid vehicles), operating of the purge pump can result in a pressure being developed in the fuel tank. If the fuel tank pressure reaches a threshold (e.g., a limit beyond which the integrity of the fuel tank may be compromised), then the wastegate opening may be adjusted to reduce the fuel tank pressure. Herein, the opening of the wastegate may be increased as the fuel tank pressure increases (e.g., increases above the threshold)

The opening of the wastegate may also be adjusted based on a temperature of air directed from the exhaust-driven pump into the canister. As discussed above, the pressurization of air causes the fresh air directed into the canister by the purge pump to be heated. In one example, the output of the purge pump may be increased by reducing an opening of the wastegate to raise the temperature of the fresh air (and thereby a temperature of the purge flow into and out of the canister).

From 224, the method moves to 226 where it is determined if the canister load is lower than a threshold (e.g., a lower threshold). As such, the canister load may drop as purging continues. If the canister has not been sufficiently purged, then at 228, the routine includes continuing to purge the canister under boost. That is, the first canister purge valve and the vent valve may be maintained closed and the second canister purge valve may be maintained open. Else, when the canister is sufficiently purged, purging under boost may be discontinued at 230. This includes closing the second canister purge valve while opening the canister vent valve. Further, a purge history of the canister may be updated in the controller's memory. It will be appreciated that throughout the purge under boost, the first canister purge valve and canister vent valve are held closed.

In this way, a canister purging method includes, during a first purging condition, adjusting an exhaust-driven positive pressure pump via a wastegate to flow fuel vapors from a canister to a compressor inlet; and during a second purging condition, applying negative pressure from an intake manifold to draw fuel vapors from the canister to an engine intake. Herein, during the first purging condition, the engine is operated with boost while during the second purging condition, the engine is operated with natural aspiration. Further, during the first purging condition, heated air is drawn into the canister while during the second purging condition, ambient air is drawn into the canister. An output of the exhaust-driven positive pressure purge pump may be adjusted via a wastegate coupled across the purge pump. The method may further comprise, during the first purging condition, adjusting an opening of the wastegate based on each of a canister purge rate and a boost pressure. During the first purging condition, a first canister purge valve coupled between the canister and the engine intake is closed and a second canister purge valve coupled between the canister and the compressor inlet is open. In comparison, during the second purging condition, the first canister purge valve is open and the second canister purge valve is closed. Further, during the first purging condition, a vent valve coupled between the canister and atmosphere is closed, while during the second purging condition, the vent valve is open.

Figure 3:
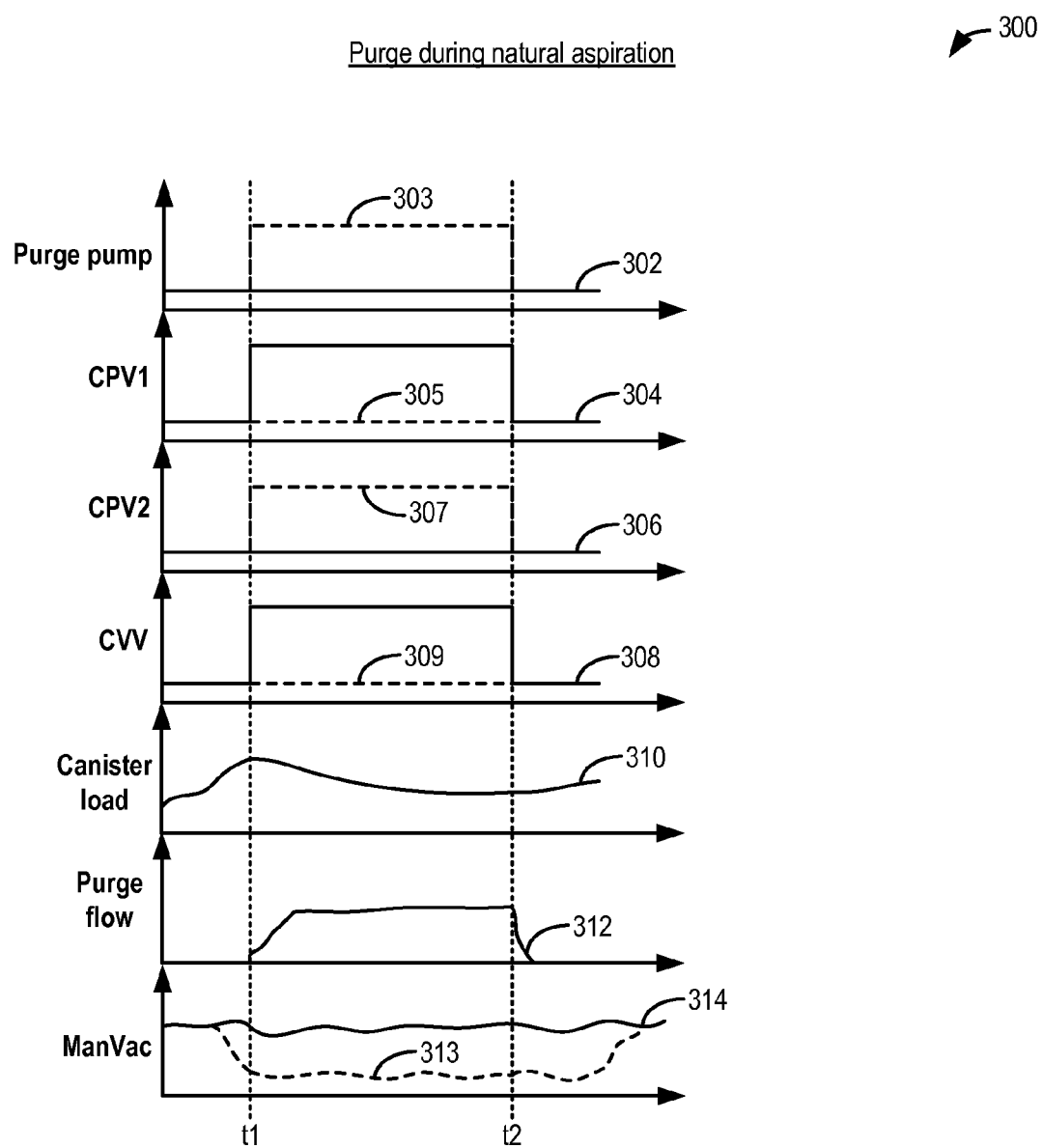
FIG. 3 shows an example purging of a fuel system canister during naturally-aspirated engine operation.
Figure 4:
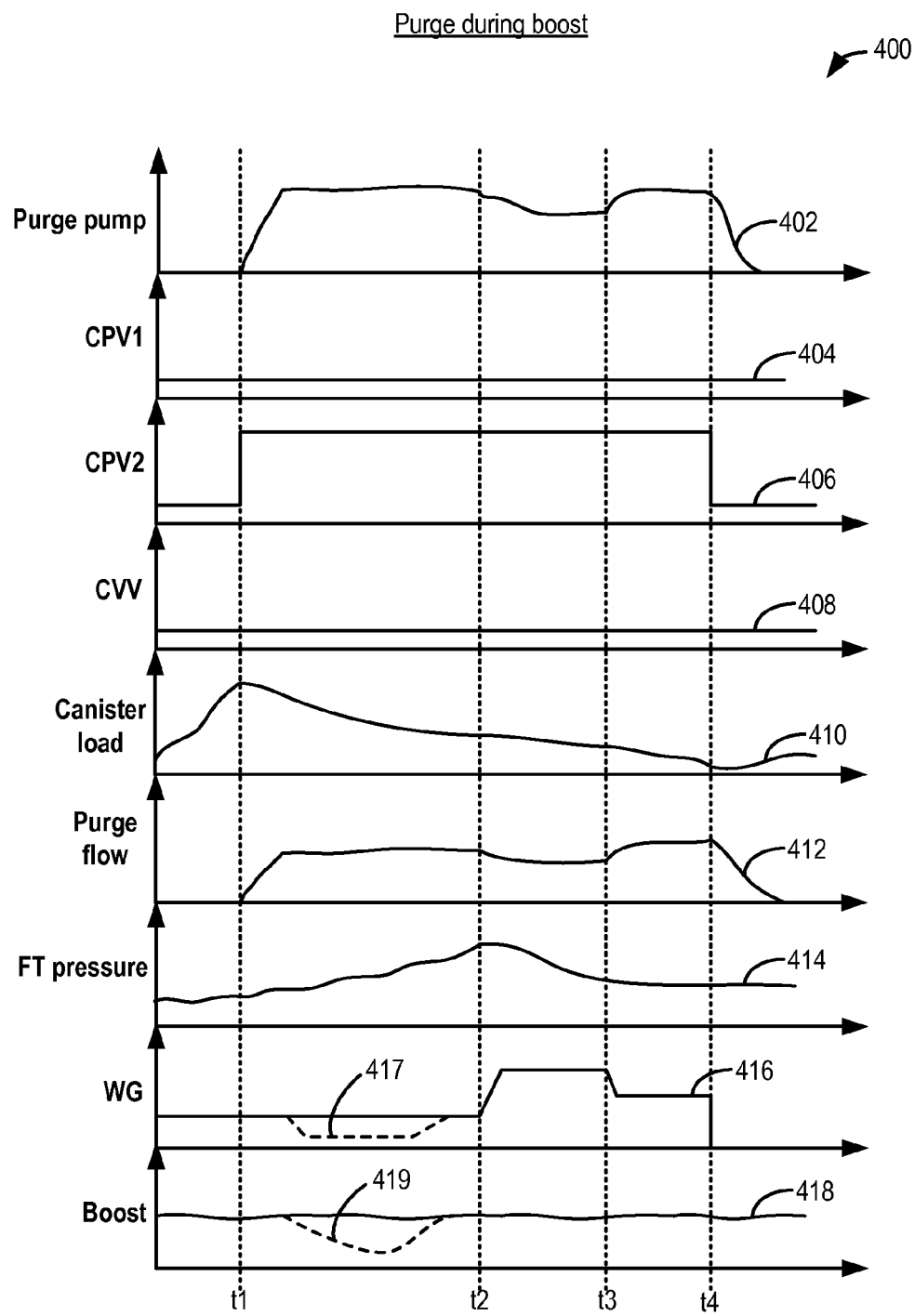
FIG. 4 shows an example purging of a fuel system canister during boosted engine operation.

FIGS. 3-4 depict example purging operations, according to the present disclosure. Specifically, FIG. 3 depicts an example of canister purging during engine operation with natural aspiration, while FIG. 4 depicts an example of canister purging during engine operation with boost.

Turning first to FIG. 3, map 300 depicts operation of a purge pump at plot 302, opening of a first canister purge valve coupled between a fuel vapor canister and an engine intake at plot 304, opening of a second canister purge valve coupled between the fuel vapor canister and the inlet of an intake compressor at plot 306, and the opening of a canister vent valve at plot 308. Map 300 further depicts a hydrocarbon load of the canister at plot 310, a purge flow (or flow rate) at plot 312, and a manifold vacuum level at plot 314.

At t0, the engine may be operating with natural aspiration and with sufficient manifold vacuum (ManVac). Between t0 and t1, as the engine operates, due to the generation of diurnal vapors in the fuel tank, a canister load of the fuel vapor canister may gradually increase. As such, during this time the purge pump may be disabled. In addition, each of the first and second canister purge valves may be held closed. A canister vent valve may also be held closed. In embodiments where the fuel system also includes a fuel tank isolation valve, the isolation valve may also be held closed.

At t1, due to the canister load reaching a threshold level, purging conditions may be considered met. Accordingly, at t1, due to sufficient manifold vacuum being available, purging under vacuum may be initiated wherein engine operation without boost continues with concurrent canister purging. In one example, an engine controller may operate the fuel system in a first purging mode in response to canister purging conditions being met while the engine is operating without boost from a turbocharger. To purge the canister under vacuum, at t1, the first canister purge valve and the vent valve may be opened while the second canister purge valve is held closed and while the purge pump is maintained disabled. By opening the first canister purge valve, engine intake vacuum may be applied to the canister. Consequently, fresh air at ambient temperature may be flowed, via intake manifold vacuum, through the canister, desorbing fuel vapors from the canister. The dislodged fuel vapors are then flowed from the canister to the engine intake, to a location downstream of an intake throttle. Specifically, fuel vapors may be purged to the engine intake at a target purge flow rate. While the present example shows the first canister purge valve fully opened, it will be appreciated that in other examples, the opening of the first canister purge valve may be adjusted to provide the target canister purge rate.

Between t1 and t2, as the purging continues, the canister load may decrease. At t2, in response to the canister load being sufficiently low, canister purging may be considered complete and the purging under vacuum may be terminated. Therein, the first canister purge valve and vent valve are closed. Engine operation without boost may continue without concurrent canister purging. As shown herein, for the entire duration of the purge under vacuum, while sufficient ManVac is available, the purge pump is maintained inoperative.

It will be appreciated however, that if there was a sudden drop in ManVac during the purging (as shown by dashed segment 313), such as due to the engine transiently operating under wide open throttle, purging under vacuum may not be possible. During such conditions, responsive to purging conditions being met at t1 while ManVac is insufficient for purging (e.g., lower than a threshold level), the first canister purge valve and the vent valve may closed (dashed segments 305 and 309) while the second canister purge valve may be opened (dashed segment 307). In addition, the purge pump may be enabled and driven using available engine exhaust (dashed segment 303). By opening the second canister purge valve, positive pressure from the purge pump may be applied to the canister. Consequently, fresh air heated upon pressurization through the pump may be flowed through the canister, desorbing fuel vapors from the canister. The dislodged fuel vapors are then flowed from the canister to a compressor inlet, from where the vapors are eventually ingested in the engine. By operating the purge pump during un-boosted engine operating conditions, fuel vapors may be purged to the engine at the target purge flow rate even when there is insufficient manifold vacuum available for purging the canister under vacuum.

Turning now to FIG. 4, map 400 depicts operation of a purge pump at plot 402, opening of a first canister purge valve coupled between a fuel vapor canister and an engine intake at plot 404, opening of a second canister purge valve coupled between the fuel vapor canister and the inlet of an intake compressor at plot 306, and the opening of a canister vent valve at plot 408. Map 400 further depicts a hydrocarbon load of the canister at plot 410, a purge flow (or flow rate) at plot 412, a fuel tank pressure at plot 414, a position of a wastegate coupled across the exhaust-driven purge pump at plot 416, and boost pressure from a turbocharger compressor at plot 418.

At t0, the engine may be operating with boost. Between t0 and t1, as the engine operates, due to the generation of diurnal vapors in the fuel tank, a canister load of the fuel vapor canister may gradually increase. As such, during this time the purge pump may be disabled. In addition, each of the first and second canister purge valves may be held closed. A canister vent valve may also be held closed. In embodiments where the fuel system also includes a fuel tank isolation valve, the isolation valve may also be held closed.

At t1, due to the canister load reaching a threshold level, purging conditions may be considered met. Accordingly, at t1, purging under boost may be initiated wherein engine operation with boost continues with concurrent canister purging. In one example, an engine controller may operate the fuel system in a second purging mode in response to canister purging conditions being met while the engine is operating with boost from the turbocharger. To purge the canister under boost, at t1, the first canister purge valve and the vent valve may be maintained closed while the second canister purge valve is opened and while the purge pump is enabled.

While operating the purge pump, an opening of a wastegate coupled across the pump may be adjusted (herein, the wastegate is held partially open, or almost closed) to adjust an output of the pump, and thereby the canister flow. By opening the second canister purge valve, fresh air pressurized by the purge pump may be applied to the canister. Consequently, fresh air that has been heated due to the pressurization may be flowed through the canister, desorbing fuel vapors from the canister. The dislodged fuel vapors are then flowed from the canister to an inlet of the compressor. From there the fuel vapors may be ingested in the engine cylinders following passage through the compressor and charge air cooler. By adjusting the opening of the wastegate, in coordination with the opening of the second canister purge valve, the fuel vapors may be purged to the engine intake at a target purge flow rate. While the present example shows the second canister purge valve fully opened, it will be appreciated that in other examples, the opening of the second canister purge valve may be adjusted to provide the target canister purge rate.

Between t1 and t2, as the purging continues, the canister load may decrease. In the depicted example, between t1 and t2, there may be a transient drop in boost pressure (dashed section 417). In response to the drop in boost pressure, an opening of the wastegate may be transiently decreased (dashed section 419) to allow the target canister purge rate to be maintained.

Also between t1 and t2, as the purging continues, a fuel tank pressure may increase due to the positive pressure being applied on the canister. Herein, the engine system may not include an isolation valve between the canister and the fuel tank, allowing the pressure on the canister to affect the pressure on the fuel tank. At t2, the fuel tank pressure may become higher than a limit. To pre-empt damage to the fuel tank from over-pressurization, the opening of the wastegate may be transiently increased between t2 and t3 to reduce fuel tank pressure. At t3, once the fuel tank pressure is within a range, the wastegate opening may be reduced to resume the target canister purge rate. Purging may then continue until t4.

At t4, in response to the canister load being sufficiently low, canister purging may be considered complete and the purging under boost may be terminated. Therein, the second canister purge valve may be closed. In addition, operation of the exhaust-driven purge pump may be discontinued. Engine operation with boost may continue without concurrent canister purging.

As one embodiment, an engine system may comprise an engine including an intake; a turbocharger including an intake compressor and an exhaust turbine; a fuel system including a fuel tank coupled to a fuel vapor canister; a first purge valve coupled between the canister and the intake; a second purge valve coupled between the canister and the compressor; a pump operated using engine exhaust received from downstream of the turbine; a wastegate for adjusting an output of the pump; and a controller. The controller may be configured with computer-readable instructions stored on non-transitory memory for operating the engine system in a first purging mode to flow ambient air, via the pump, through the canister and flow fuel vapors from the canister to an inlet of the compressor. The controller may further operate the engine system in a second purging mode to flow ambient air, via intake manifold vacuum, through the canister and flow fuel vapors from the canister to the intake, downstream of an intake throttle. The operating in the first purging mode is performed in response to canister purging conditions being met while the engine is operating with boost from the turbocharger, while the operating in the second purging mode is performed in response to canister purging conditions being met while the engine is operating without boost from the turbocharger. Operating in the first mode includes operating with the first purge valve closed and the second purge valve open, while operating in the second mode includes operating with the first purge valve open and the second purge valve closed. Operating in the first mode further includes adjusting an opening of the wastegate based on a canister purge rate and a boost pressure of the turbocharger, while operating in the second mode further includes maintaining an opening of the wastegate. Herein, the ambient air flowed while operating in the first mode is at a higher temperature than the ambient air flowed while operating in the second mode.

In a further representation, a canister purging method includes, operating an engine with natural aspiration, and during a first purging condition, adjusting an exhaust-driven positive pressure pump via a wastegate to flow fuel vapors from a canister to a compressor inlet; and during a second purging condition, applying negative pressure from an intake manifold to draw fuel vapors from the canister to an engine intake. Herein, during the first purging condition, the intake manifold vacuum level of the naturally aspirated engine is lower than a threshold level of vacuum, while during the second purging condition, the intake manifold vacuum level of the naturally aspirated engine is higher than the threshold level of vacuum. Further, during the first purging condition, heated fresh air is drawn into the canister while during the second purging condition, ambient temperature fresh air is drawn into the canister. An output of the exhaust-driven positive pressure purge pump may be adjusted via a wastegate coupled across the purge pump. Herein, fuel vapors are purged from the canister to the engine via distinct purge paths during the first purging condition relative to the second purging condition. Specifically, the purging during the first condition is via a first purge path distinct from a second purge path used during the second purging condition. The first purge path may diverge (or branch off) from the second purge path at a location upstream of a first canister purge valve. The method may further comprise, during the first purging condition, adjusting an opening of the wastegate based on one or more of the intake manifold vacuum level and an exhaust pressure. For example, the opening of the wastegate may be increased as the manifold vacuum level increases. Further, when the manifold vacuum level increases to the threshold level, purging the canister to the compressor inlet via positive pressure from the purge pump may be discontinued and the engine may transition to purging the canister to the engine intake via negative pressure from the engine intake. During the first purging condition, a first canister purge valve coupled between the canister and the engine intake is closed and a second canister purge valve coupled between the canister and the compressor inlet is opened. In comparison, during the second purging condition, the first canister purge valve is opened and the second canister purge valve is closed. Further, during the first purging condition, a vent valve coupled between the canister and atmosphere is closed, while during the second purging condition, the vent valve is opened.

In a still further representation, a canister purging method includes, when operating an engine with natural aspiration, and while an intake manifold vacuum level is higher than a threshold vacuum, applying negative pressure from an intake manifold to draw fuel vapors from a canister to an engine intake. The method further includes, when operating the engine with natural aspiration, and while the intake manifold vacuum level is lower than the threshold vacuum, operating an exhaust-driven positive pressure pump via a wastegate to flow fuel vapors from the canister to a compressor inlet. Further, when operating the engine with boost, and while the boost level is higher than a threshold boost, operating the exhaust-driven positive pressure pump via the wastegate to flow fuel vapors from the canister to a compressor inlet. The method further includes, when operating the engine and while each of boost level is lower than the threshold boost and intake manifold vacuum level is lower than the threshold vacuum, operating the exhaust-driven positive pressure pump via the wastegate to flow fuel vapors from the canister to a compressor inlet.

In this way, canister purging under boosted (and unboosted) operating conditions can be better enabled. The technical effect of operating an exhaust-driven purge pump is that a more thorough canister cleaning can be provided when purging a canister in the presence of boost, as well as when an engine is operated in a vacuumless mode (e.g., when the vacuum is minimal, when the engine is operating at wide open throttle, or when the manifold vacuum is at atmospheric conditions), or in a no man's land between naturally-aspirated and boosted engine operation. By delivering ambient air pressurized to positive pressure via the pump into the canister, the purge air can be heated, improving migration of hydrocarbons from the canister. By improving the purging capacity of an engine during boosted conditions, boosted purge can be performed without the need for additional hardware such as larger ejectors. By improving canister purging efficiency, exhaust emissions compliance is improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during boosted engine operation,
      flowing exhaust to an exhaust-driven pump to spin the exhaust-driven pump; and
      purging a fuel vapor canister to a compressor inlet with positive pressure drawn from the exhaust-driven pump.

2. The method of claim 1, further comprising, adjusting an output of the exhaust-driven pump via a wastegate.

3. The method of claim 2, wherein the adjusting includes decreasing an opening of the wastegate to increase the output of the exhaust-driven pump.

4. The method of claim 2, wherein an opening of the wastegate is adjusted based on a fuel tank pressure, the opening increased as the fuel tank pressure increases.

5. The method of claim 2, wherein an opening of the wastegate is adjusted based on a temperature of air directed from the exhaust-driven pump into the canister.

6. The method of claim 1, wherein the purging includes closing one or more of a vent valve coupled in a vent line of the canister and a vapor blocking valve coupled between the canister and a fuel tank.

7. The method of claim 6, further comprising, during non-boosted engine operation, while an intake manifold vacuum level is higher than a threshold vacuum, purging the fuel vapor canister to an engine intake, downstream of an intake throttle, with negative pressure drawn from the engine intake; and while the intake manifold vacuum level is lower than the threshold vacuum, purging the fuel vapor canister to the compressor inlet with positive pressure drawn from the exhaust-driven pump, wherein the threshold vacuum is an intake manifold vacuum level sufficient for purging the fuel vapor canister.

8. A method for an engine, comprising:
   during boosted engine operation,
      flowing exhaust to an exhaust-driven pump to spin the exhaust-driven pump; and
      purging a fuel vapor canister to a compressor inlet with positive pressure drawn from the exhaust-driven pump, wherein the purging includes closing a first purge valve coupled between the canister and an engine intake while opening a second purge valve coupled between the canister and an outlet of the exhaust-driven pump.

9. The method of claim 8, further comprising, adjusting an output of the exhaust-driven pump via a wastegate.

10. The method of claim 9, wherein the adjusting includes decreasing an opening of the wastegate to increase the output of the exhaust-driven pump.

11. The method of claim 9, wherein an opening of the wastegate is adjusted based on a fuel tank pressure, the opening increased as the fuel tank pressure increases.

12. The method of claim 9, wherein an opening of the wastegate is adjusted based on a temperature of air directed from the exhaust-driven pump into the canister.

13. The method of claim 8, wherein the purging further includes closing one or more of a vent valve coupled in a vent line of the canister and a vapor blocking valve coupled between the canister and a fuel tank.

14. The method of claim 13, further comprising, during non-boosted engine operation, while an intake manifold vacuum level is higher than a threshold vacuum, purging the fuel vapor canister to the engine intake, downstream of an intake throttle, with negative pressure drawn from the engine intake; and while the intake manifold vacuum level is lower than the threshold vacuum, purging the fuel vapor canister to the compressor inlet with positive pressure drawn from the exhaust-driven pump, wherein the threshold vacuum is an intake manifold vacuum level sufficient for purging the fuel vapor canister.

15. The method of claim 14, wherein the purging during non-boosted engine operation includes opening each of the first purge valve and the canister vent valve while closing the second purge valve.

* * * * *